(12) United States Patent
Bento

(10) Patent No.: US 6,755,214 B2
(45) Date of Patent: Jun. 29, 2004

(54) SOLENOID VALVE FOR REDUCED ENERGY CONSUMPTION

(75) Inventor: Jose C. Bento, Sao Paulo (BR)

(73) Assignee: Ross Operating Value Company, Troy, MI (US)

( * ) Notice: Subject to any disclaimer, the term of this patent is extended or adjusted under 35 U.S.C. 154(b) by 0 days.

(21) Appl. No.: 10/329,300

(22) Filed: Dec. 23, 2002

(65) Prior Publication Data

US 2003/0140975 A1 Jul. 31, 2003

Related U.S. Application Data

(63) Continuation-in-part of application No. 10/209,655, filed on Jul. 31, 2002.
(60) Provisional application No. 60/309,843, filed on Aug. 3, 2001.

(51) Int. Cl.[7] .............................................. F15B 13/043
(52) U.S. Cl. ..................... 137/625.64; 91/433; 137/270
(58) Field of Search .................. 91/426, 433; 137/270, 137/625.64

(56) References Cited

U.S. PATENT DOCUMENTS 3,903,787 A 9/1975 Kroth et al.
4,041,983 A * 8/1977 Bianchetta ................... 91/433
4,067,357 A 1/1978 Ruchser
4,617,968 A * 10/1986 Hendrixon ............. 137/625.64

FOREIGN PATENT DOCUMENTS

| DD | CH 364152 | 8/1962 | |
| GB | 2255840 | 11/1992 | |
| JP | 1-283408 A | * 11/1989 | |

* cited by examiner

Primary Examiner—Gerald A. Michalsky
(74) Attorney, Agent, or Firm—Mark L. Mollon; MacMillan, Sobanski & Todo

(57) ABSTRACT

A control valve system including a housing having an inlet, a first output, and a second output. The control valve system further includes a slidable valve positionable in a first position, where fluid communication is established between the inlet and the first output; a second position, where fluid communication is established between the inlet and the second output; and a third position, where fluid communication is prevented between the inlet and the first or second output. A solenoid valve assembly is coupled in fluid communication with the inlet and is positionable in an actuated position, where fluid communication is established with the inlet to move the valve from the first position to the second position, and a deactuated position. A piston selectively extendable to position the valve in the third position in response to fluid pressure within the first output.

25 Claims, 10 Drawing Sheets

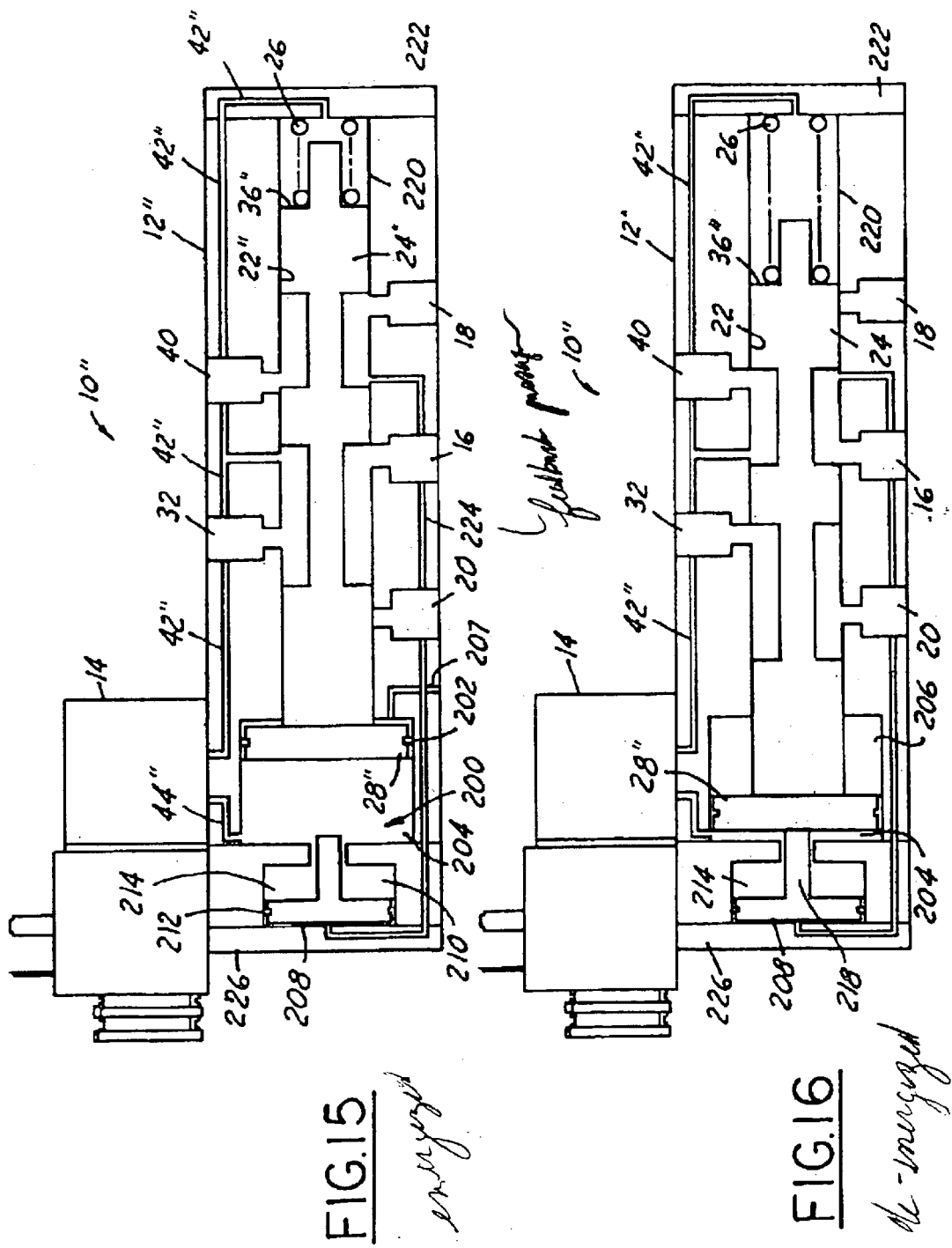

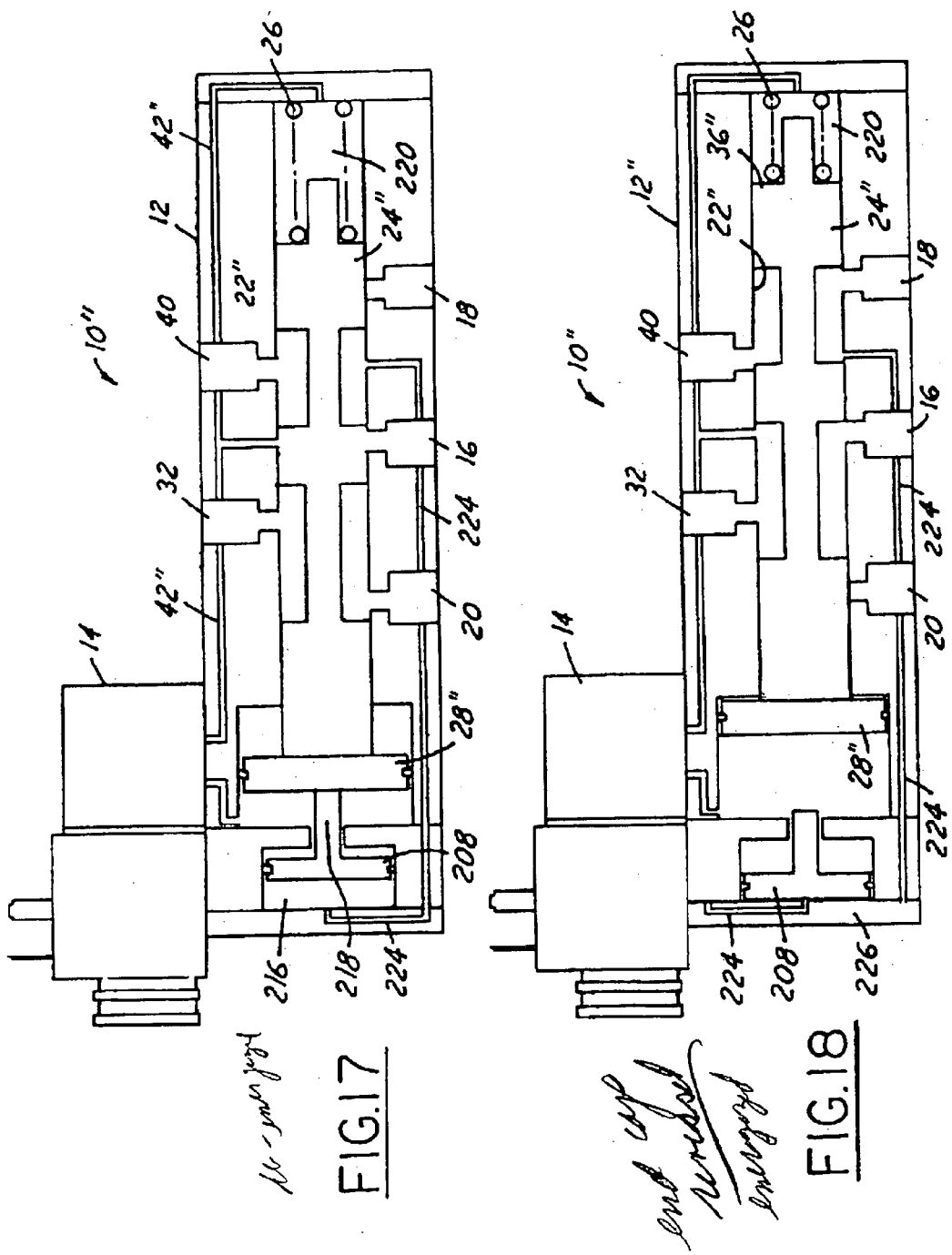

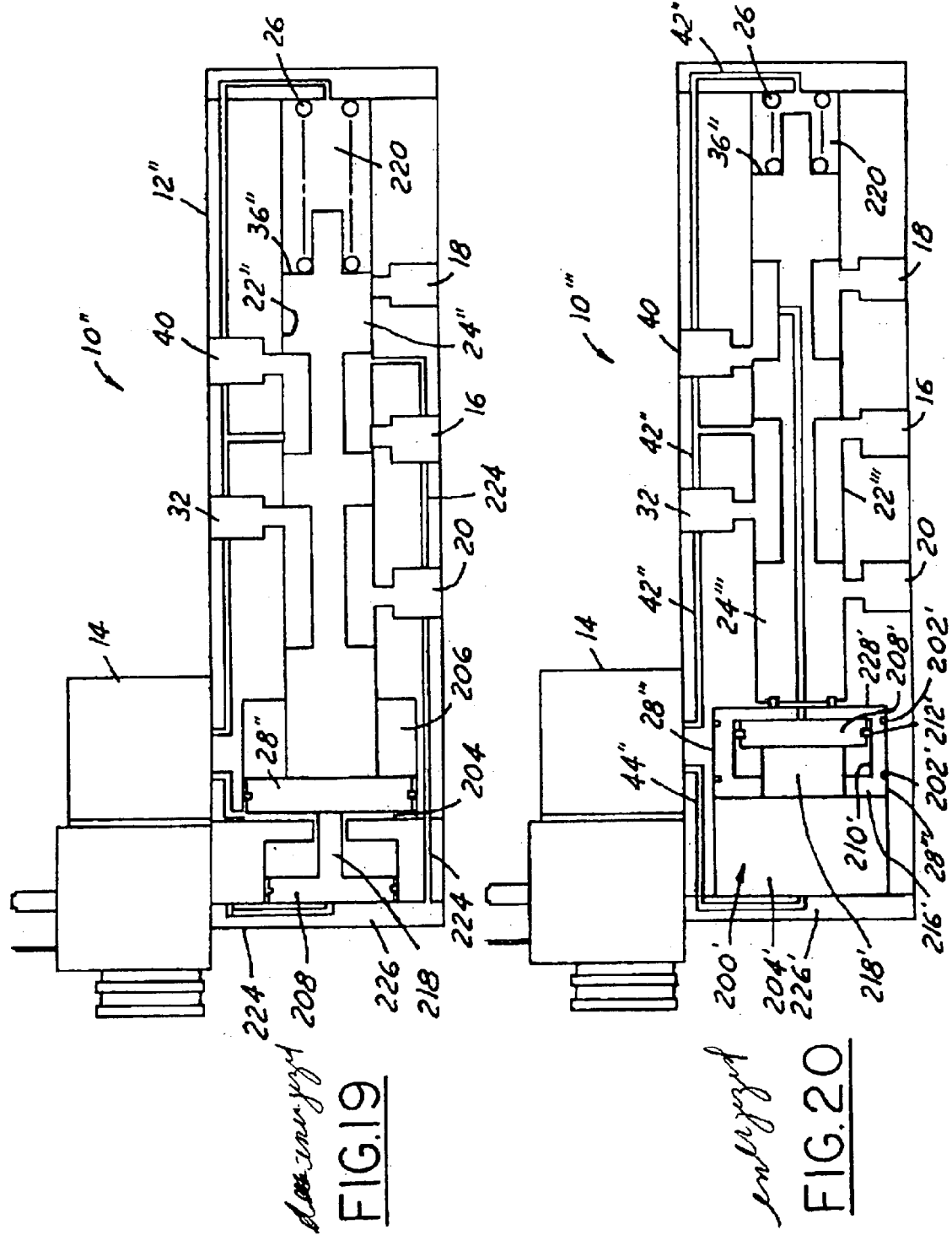

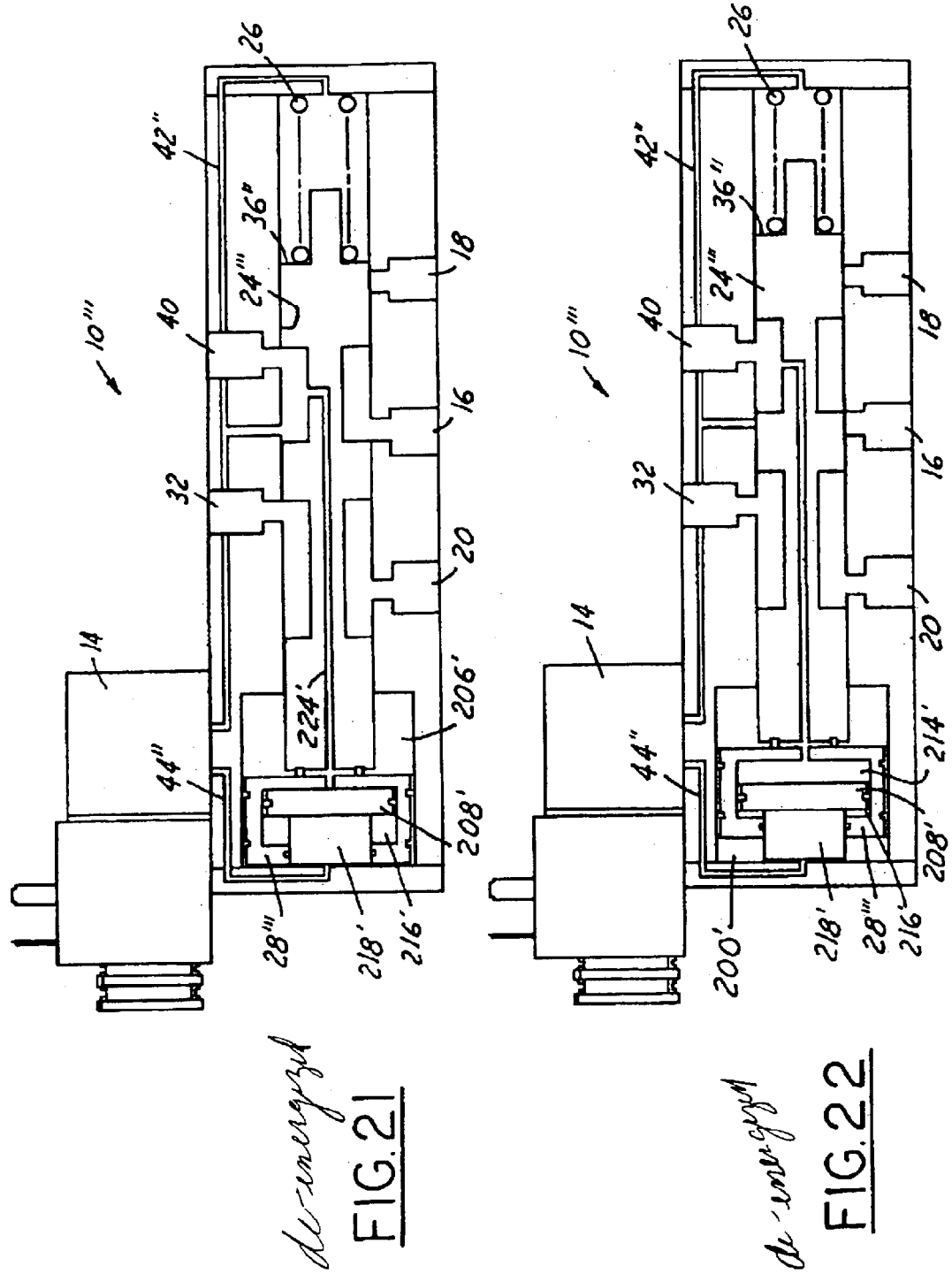

SOLENOID VALVE FOR REDUCED ENERGY CONSUMPTION

CROSS-REFERENCE TO RELATED APPLICATIONS

This application is a continuation-in-part of U.S. patent application Ser. No. 10/209,655 filed on Jul. 31, 2002, which claims the benefit of U.S. Provisional Application No. 60/309,843, filed Aug. 3, 2001. The disclosures of the above applications are incorporated herein by reference.

FIELD OF THE INVENTION

The present invention generally relates to control valves and, more particularly, relates to a control valve capable of reducing the energy consumption thereof.

BACKGROUND OF THE INVENTION

As is well known in the art, control valves have frequently been used to control and supply a working fluid, such as air, to a working device. Typically, these control valves employ a moveable valve spool disposed in a valve housing. The valve housing includes a plurality of fluid passages that are selectively interconnected in response to movement of the valve spool so as to control the flow of the fluid and, thus, the output of the control valve.

Conventional control valves often employ a solenoid valve mounted thereto for actuating the valve spool. The solenoid valve is controlled via an electrical input signal between a first position, where the solenoid valve is de-energized so as to close a fluid passage between an input pilot pressure and an output controlling pressure and to open the outlet to atmosphere, and a second position, where the solenoid is energized via the electrical input so as to open a passageway between the input pilot pressure and the output controlling pressure and block the fluid passage from outlet to exhaust.

It should be readily appreciated to one skilled in the art that in order to apply a constant controlling pressure, the electrical control signal must continue to energize the solenoid valve. That is, in order for a conventional control valve to maintain the spool in a predetermined position, it is necessary to maintain a constant control pressure upon one side of the spool. Therefore, in order to maintain this constant control pressure on the spool, it is necessary to maintain the solenoid valve in an opened and, thus, energized state. Moreover, it is necessary to employ full line fluid pressure to displace and maintain the working device in a predetermined position. Therefore, it will be understood that operating a device at full line pressure requires more energy to drive compressors than operating the device at a reduced line pressure.

Accordingly, there exists a need in the relevant art to provide a control valve capable of producing an output of working fluid to be used with a conventional working device that is capable of minimizing the energy consumed during actuation. Furthermore, there exists a need in the relevant art to provide a control valve that maintains the position of a control element at a pressure less than full line pressure. Still further, there exists a need in the relevant art to overcome the disadvantages of the prior art.

SUMMARY OF THE INVENTION

A control valve system having an advantageous construction is provided. The control valve system includes a slidable valve positionable in a first position, where fluid communication is established between the inlet and the first output; a second position, where fluid communication is established between the inlet and the second output; and a third position, where fluid communication is prevented between the inlet and the first or second output. A solenoid valve assembly is coupled in fluid communication with the inlet and is positionable in an actuated position, where fluid communication is established with the inlet to move the valve from the first position to the second position, and a deactuated position. A piston selectively engages the valve to position the valve in the third position in response to fluid pressure within the first output.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 15 is a cross-sectional view of a control valve system according to a fourth embodiment of the present invention illustrated in a normal operation mode where the solenoid valve assembly is energized;

FIG. 16 is a cross-sectional view illustrating the control valve system of FIG. 15 wherein the solenoid valve assembly is de-energized;

FIG. 17 is a cross-sectional view illustrating the control valve system of FIG. 15 being maintained in a predetermined position while the solenoid valve assembly remains de-energized and the valve spool is in an equilibrium position;

FIG. 18 is a cross-sectional view of the control valve system of FIG. 15, having an end cap reversed, in a normal operation mode where the solenoid valve assembly is energized;

FIG. 19 is a cross-sectional view of the control valve system of FIG. 15, having the end cap reversed, where the solenoid valve assembly is de-energized;

FIG. 20 is a cross-sectional view of a variation of the control valve system of FIG. 15 illustrated in a normal operation mode where the solenoid valve assembly is energized;

FIG. 21 is a cross-sectional view illustrating the control valve system of FIG. 20 wherein the solenoid valve assembly is de-energized;

FIG. 22 is a cross-sectional view illustrating the control valve system of FIG. 20 being maintained in a predetermined position while the solenoid valve assembly remains de-energized and the valve spool is in an equilibrium position.

DETAILED DESCRIPTION OF THE PREFERRED EMBODIMENTS

Figure 1:
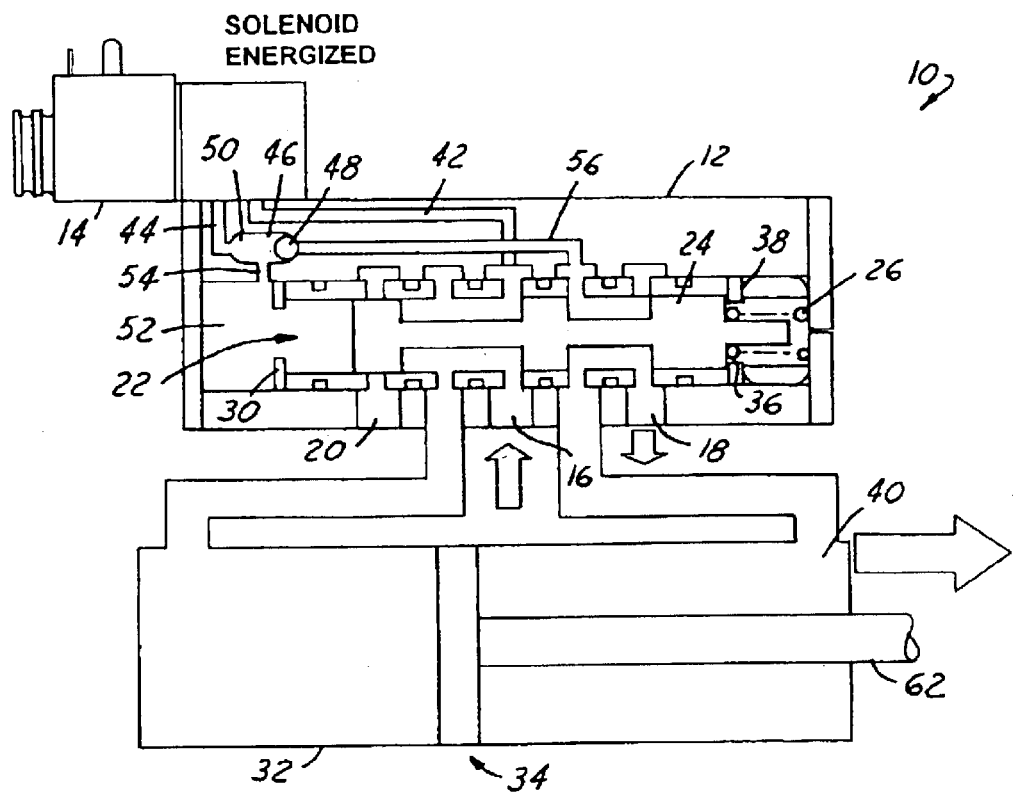
FIG. 1 is a cross-sectional view of a control valve system according to a first embodiment of the present invention illustrated in a normal operation mode where the solenoid valve assembly is energized.

The following description of the preferred embodiments is merely exemplary in nature and is in no way intended to limit the invention, its application, or uses. For example, the principles of the present invention are equally applicable to a wide variety of valve systems, such as spool valves, poppet valves (i.e. resilient, metal, ceramic, and the like), trapping presses, and feedback controls.

Referring now to FIGS. 1–4 in which like reference numerals designate like or corresponding parts throughout the several views, there is illustrated a control valve system, which is designated generally by the reference numeral 10. Control valve system 10 is shown as a fluid control valve in FIGS. 1–3 and as a fluid circuit in FIG. 4.

Figure 2:
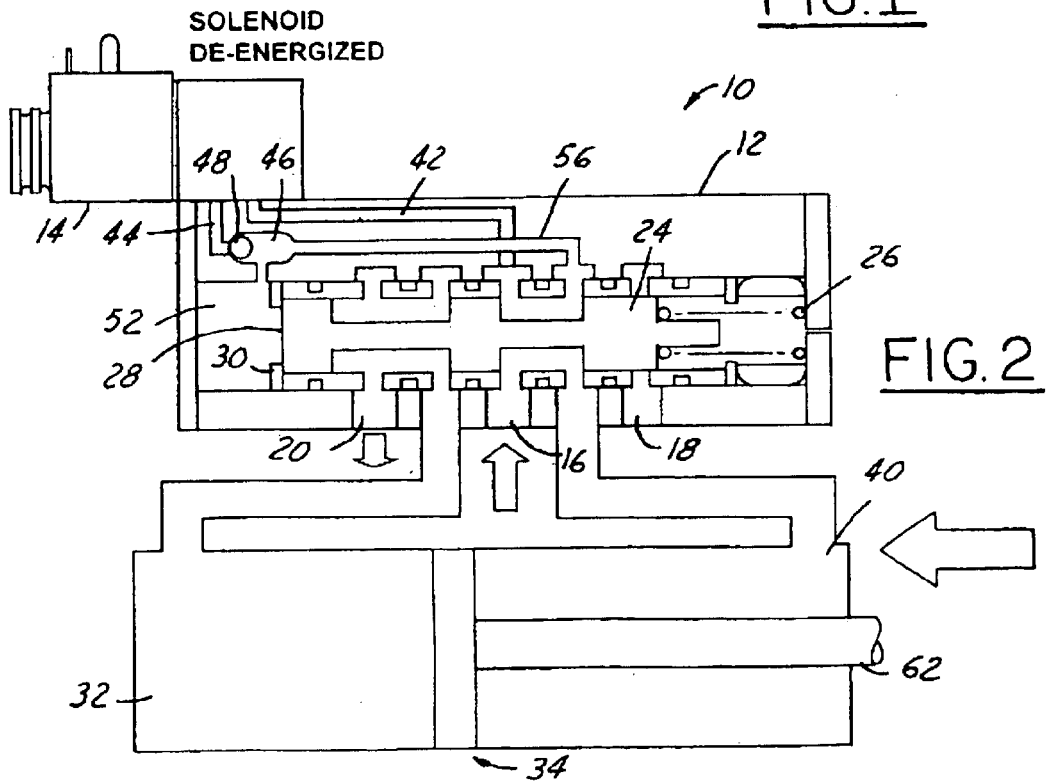
FIG. 2 is a cross-sectional view illustrating the control valve system of FIG. 1 wherein the solenoid valve assembly is de-energized.
Figure 3:
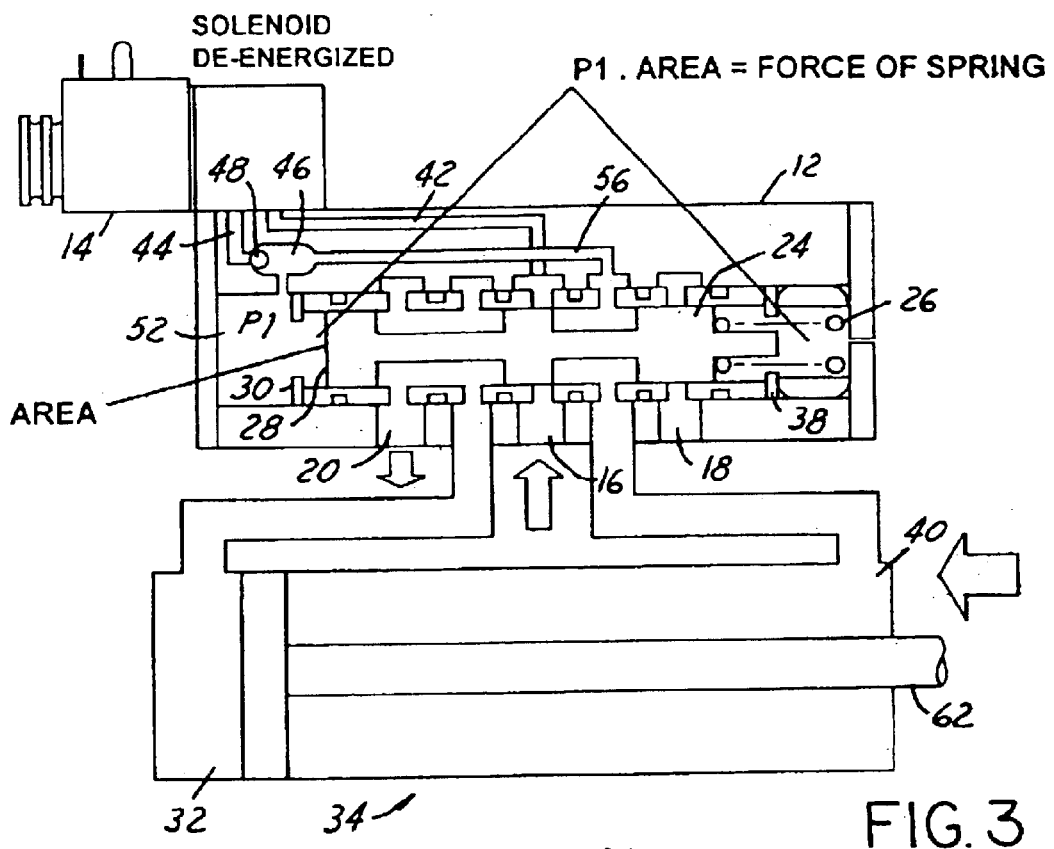
FIG. 3 is a cross-sectional view illustrating the control valve system of FIG. 1 being maintained in a predetermined position while the solenoid valve assembly remains de-energized and the valve spool is in an equilibrium position.

Referring in particular to FIGS. 1–3, control valve system 10 comprises a main valve assembly 12 and a solenoid valve assembly 14. Main valve assembly 12 is positioned adjacent to and operably coupled to solenoid valve assembly 14. Main valve assembly 12 includes a fluid inlet passage 16, a first exhaust passage 18, a second exhaust passage 20, and a valve bore 22. Disposed within valve bore 22 is a valve member or spool 24. Spool 24 is normally biased via a spring 26 into a seated position where a face portion 28 of spool 24 contacts a first stop 30 disposed in valve bore 22 to exhaust fluid from a backside chamber 32 of a piston member assembly 34 out second exhaust passage 20. As will be described below, spool 24 is further positionable in an unseated position where face portion 28 of spool 24 is spaced apart from first stop 30 of valve bore 22, yet a shoulder portion 36 disposed on an opposing side of spool 24 contacts a second stop 38 disposed in valve bore 22 to exhaust fluid from a front side chamber 40 of piston member assembly 34 through first exhaust passage 18.

It should be appreciated that spring 26 may be eliminated. In this case, spool 24 would be actuated in response to differential fluid pressure exerted upon opposing faces of spool 24. It is also anticipated that these faces could include differently sized surfaces areas (i.e. different area ratios), which would enable control valve system 10 to be easily modified to produce a wide range of different output pressures.

Control valve system 10 further includes a plurality of fluid passages interconnecting fluid inlet passage 16, first exhaust passage 18, and second exhaust passage 20. A fluid passage 42 extends between fluid inlet passage 16 and an inlet to solenoid valve assembly 14. Fluid passage 42 serves as a pilot passage to supply a pilot pressure to solenoid valve assembly 14. A fluid passage 44 extends between an outlet of solenoid valve assembly 14 and a shuttle valve 46.

Shuttle valve 46 generally includes a shuttle ball 48 moveably disposed in a shuttle chamber 50. As will be described below, shuttle valve 46 moves in response to fluid pressure to fluidly block opposing ends of shuttle valve 46 against fluid flow. Shuttle valve 46 is fluidly coupled to a valve chamber 52 via a fluid passage 54. Valve chamber 52 is adjacent face portion 28 of spool 24 and disposed within valve bore 22 such that fluid pressure within valve chamber 52 acts upon face portion 28 to move spool 24 against the biasing force of spring 26.

Figure 12:
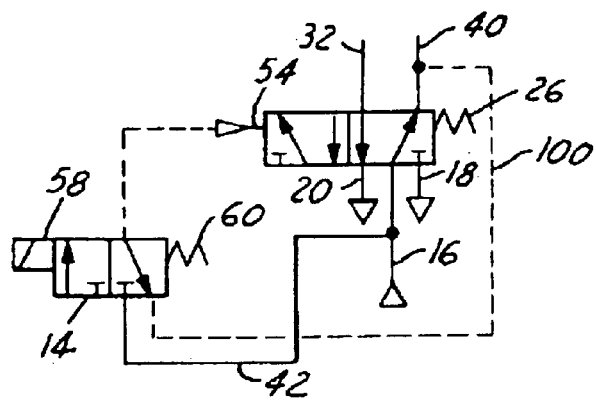
FIG. 12 is a circuit diagram of a control valve system according to a third embodiment of the present invention illustrated in an initial position where the solenoid valve assembly is de-energized and the piston is stationary.
Figure 13:
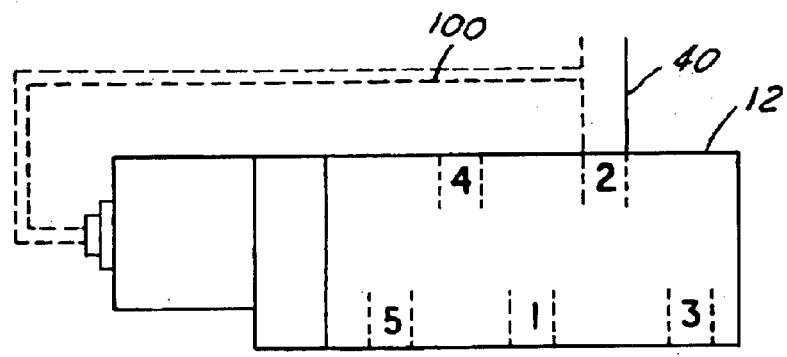
FIG. 13 is a schematic diagram illustrating the feedback passage being disposed externally from the housing.
Figure 14:
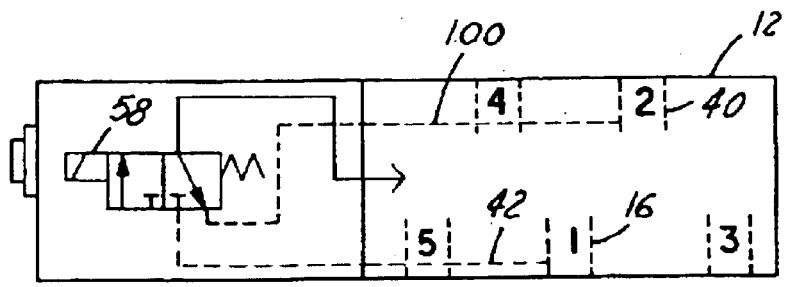
FIG. 14 is a schematic diagram illustrating the feedback passage being disposed internally in the housing.

However, as seen in FIGS. 12–14, shuttle ball 48 may be eliminated to provide a more simplified design. Specifically, a fluid passage 100 extends between front side chamber 40 and solenoid 58. Fluid passage 100 permits the flow or exhaust of pilot fluid from valve chamber 52 to front side chamber 40 when solenoid 58 is in the position shown in FIG. 12. However, it should be appreciated that fluid passage 100 may extend either externally (see FIG. 13) or internally (FIG. 14) of main valve assembly 12.

Control valve system 10 further includes a feedback passage 56 extending between shuttle valve 46 and first exhaust passage 18. Accordingly, shuttle ball 48 of shuttle valve 46 is moveable within shuttle chamber 50 into a first position, where shuttle ball 48 prevents fluid flow through feedback passage 56, and a second position, where shuttle ball 48 prevents back flow of fluid through fluid passage 44.

Figure 4:
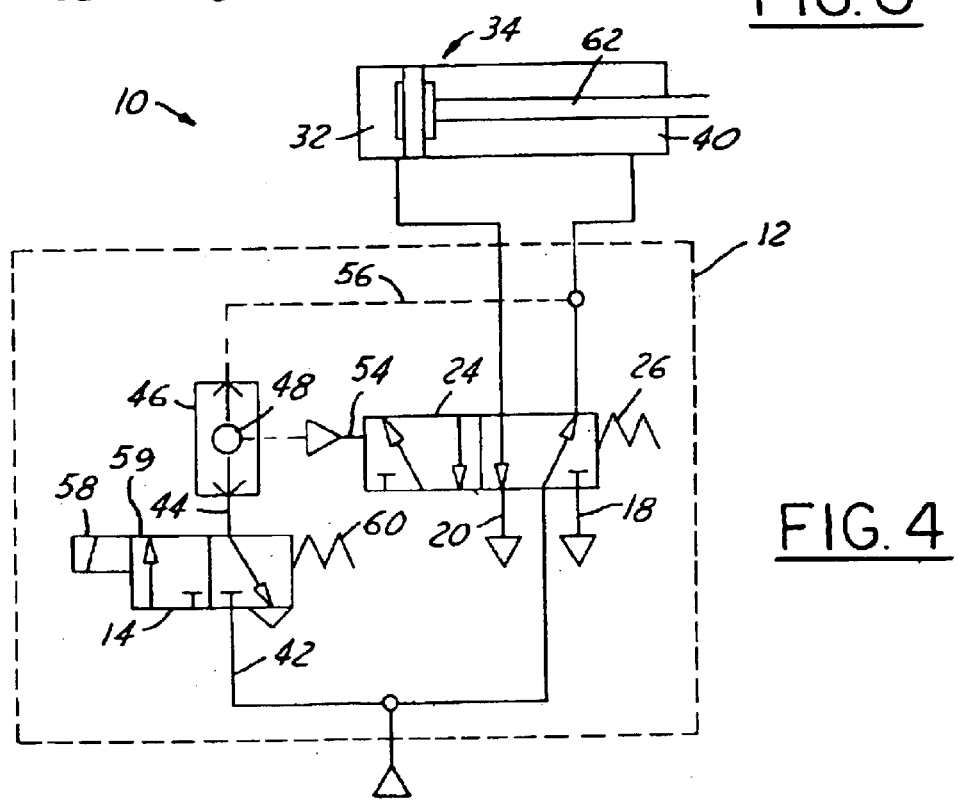
FIG. 4 is a circuit diagram illustrating the control valve system according to the first embodiment of the present invention.

FIG. 1 illustrates control valve system 10 in a normal operation mode in which pressurized fluid from fluid inlet passage 16 is directed into backside chamber 32 of piston member assembly 34 to drive a piston 62 outward (to the right in the figures). Specifically, pressurized fluid from fluid inlet passage 16 is provided in fluid passage 42. Referring to FIG. 4, energizing solenoid valve assembly 14 will establish a fluid communication between fluid passage 42 and fluid passage 44. That is, a solenoid 58 of solenoid valve assembly 14 is energized such that a solenoid spool 59 is moved to the right in FIG. 4 against the biasing force of a solenoid spring 60. Pressurized fluid is then introduced from fluid passage 44 into shuttle valve 46, thereby moving shuttle ball 48 against feedback passage 56. Pressurized fluid within shuttle valve 46 is then directed into valve chamber 52. The fluid pressure within valve chamber 52 acts upon face portion 28 of spool 24. Once the fluid pressure within valve chamber 52 is greater than the biasing force of spring 26, spool 24 moves to the right until shoulder portion 36 of spool 24 is seated upon second stop 38. This movement of spool 24 enables fluid to flow from fluid inlet passage 16 into backside chamber 32 of piston member assembly 34, thereby extending piston 62 outward (to the right in FIGS. 1–4). Accordingly, when control valve system 10 is in the position illustrated in FIG. 1, fluid inlet passage 16, backside chamber 32 of piston member assembly 34, fluid passage 42, shuttle valve 46, and valve chamber 52 are all at the same fluid pressure, namely equal to the fluid pressure of fluid inlet passage 16.

Referring now to FIG. 2, solenoid valve assembly 14 is de-energized and therefore pilot fluid from fluid passage 42 is prevented from entering shuttle valve 46 and, consequently, valve chamber 52. Therefore, the biasing force of spring 26 acting on shoulder portion 36 of spool 24 biases spool 24 leftward until face portion 28 generally contacts first stop 30. This leftward movement of spool 24 enables fluid communication between fluid inlet passage 16 and front side chamber 40 of piston member assembly 34, thereby retracting piston 62.

As can be appreciated from FIG. 2, feedback passage 56 is in fluid communication with front side chamber 40 of piston member assembly 34 and, therefore, is at the same fluid pressure. The introduction of pressurized fluid from fluid inlet passage 16 into front side chamber 40 and feedback passage 56 forces shuttle ball 48 of shuttle valve 46 leftward, since the fluid pressure of fluid inlet passage 16 is now greater than the fluid pressure within valve chamber 52. This leftward movement of shuttle ball 48 and shuttle valve 46 then permits fluid flow from front side chamber 40 of piston member assembly 34 into valve chamber 52, thereby increasing the fluid pressure within valve chamber 52 once again. During this time, fluid is exhausted from backside chamber 32 of piston member assembly 34 through second exhaust passage 20.

As best seen in FIG. 3, fluid flow from fluid inlet passage 16 into front side chamber 40 of piston member assembly 34 and valve chamber 52 will continue until the pressure within valve chamber 52 is equal to the biasing force of spring 26. When the fluid pressure within valve chamber 52 equals the biasing force of spring 26, spool 24 reaches an intermediate equilibrium position wherein fluid flow from fluid inlet passage 16 into any of the remaining fluid passages is prevented. However, it should be appreciated by one skilled in the art that any fluid leaks or other anomalies which decrease the fluid pressure in front side chamber 40 of piston member assembly 34 will cause a simultaneous decrease in fluid pressure within valve chamber 52. This decrease in fluid pressure in valve chamber 52 enables spring 26 to move spool 24 leftward, thereby again opening fluid communication between fluid inlet passage 16 and front side chamber 40 of piston member assembly 34. As explained above, this fluid communication will continue until the fluid pressure within front side chamber 40, feedback passage 56, and valve chamber 52 is equal to the biasing force of spring 26. Therefore, it should be clear that feedback passage 56 serves to provide a method of automatically maintaining a fluid pressure in front side chamber 40 of piston member assembly 34 simply by choosing an appropriate biasing force in spring 26. The preferred fluid pressure to be maintained is directly proportional to the force of spring 26 and, therefore, spring 26 may be selected to determine the equilibrium fluid pressure.

Moreover, it should be appreciated that the pressure regulation feature of the present invention is accomplished without the need to provide full line pressure, which would otherwise consume an excessive amount of electrical energy. That is, by way of non-limiting example, traditional double action cylinders often operate such that their return to their initial position is only accomplished through the use of full-line pressure. This use of full-line pressure in the return stroke consumes an equivalent amount of compressed air as that consumed during a power stroke. This consumption of compressed air during the return stroke is believed to be unnecessary. According to the principles of the present invention, the low pressure in one outlet is sufficient for a rapid return stroke, which reduces the amount of compressed air that is consumed, thereby reducing the energy consumed by the work element. Additionally, due to the low pressure that is applied, the potential for leaks in the cylinder and/or fittings is also reduced. These advantages are obtained through the operation of the spool as a pressure regulator.

Referring now to FIGS. 5–11, in which like reference numerals designate like or corresponding parts throughout the several views and those views of the first embodiment, there is illustrated a control valve system 10' in accordance with a second embodiment of the present invention. Control valve system 10' is illustrated as a fluid control valve in FIGS. 5–10 and as a schematic fluid circuit in FIG. 11.

Figure 5:
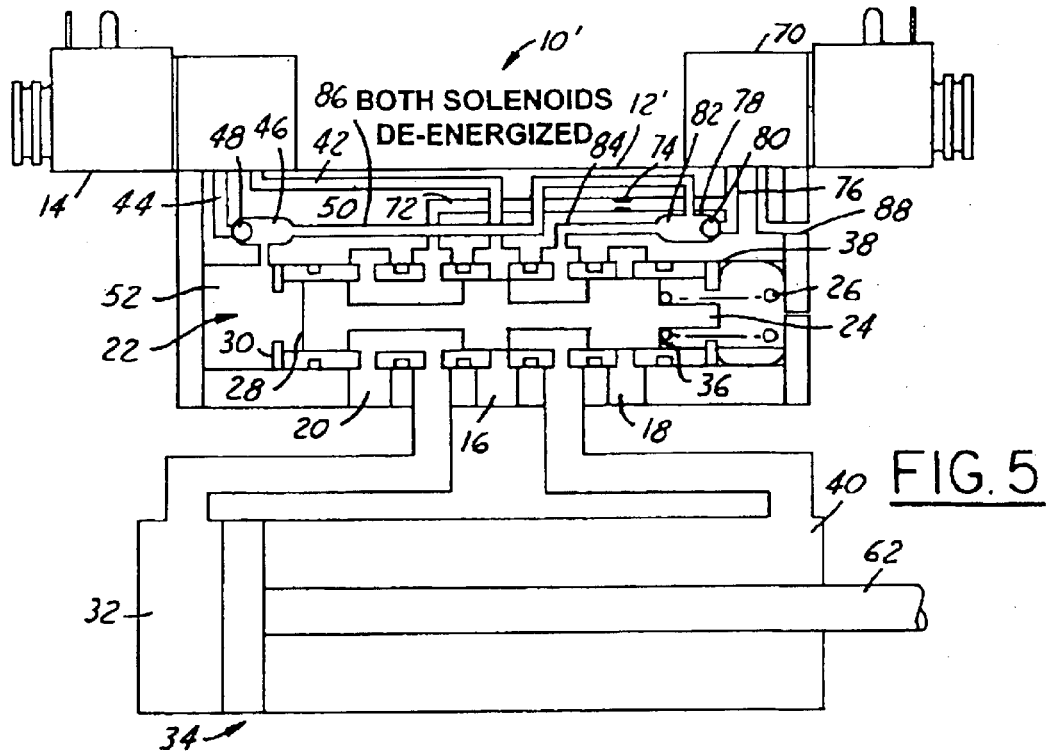
FIG. 5 is a cross-sectional view of a control valve system according to a second embodiment of the present invention illustrated in an initial position where the first and second solenoid valve assemblies are de-energized and the piston is stationary.

Referring now to FIG. 5, control valve system 10' comprises a second solenoid valve assembly 70 that is mounted to a main valve assembly 12'. Main valve assembly 12' is positioned adjacent to and operably coupled to first solenoid valve assembly 14 and second solenoid valve assembly 70. Main valve assembly 12' includes fluid inlet passage 16, first exhaust passage 18, second exhaust passage 20, and valve bore 22. Disposed within valve bore 22 is spool 24. Spool 24 is normally biased via spring 26 into a seated position where face portion 28 of spool 24 contacts first stop 30 disposed in valve bore 22 to exhaust fluid from backside chamber 32 of piston member assembly 34 out second exhaust passage 20. As described above, spool 24 is positionable in an unseated position where face portion 28 of spool 24 is spaced apart from first stop 30 of valve bore 22, yet shoulder portion 36 contacts second stop 38 disposed in valve bore 22 to exhaust fluid from front side chamber 40 of piston member assembly 34 through first exhaust passage 18.

Control valve system 10' further includes a plurality of fluid passages interconnecting fluid inlet passage 16, first exhaust passage 18, and second exhaust passage 20. Fluid passage 42 extends between fluid inlet passage 16 and the inlet to solenoid valve assembly 14. Fluid passage 42 serves as a pilot passage to supply pilot pressure to solenoid valve assembly 14. Fluid passage 44 extends between the outlet of solenoid valve assembly 14 and shuttle valve 46. Shuttle valve 46 generally includes shuttle ball 48 moveably disposed in a shuttle chamber 50. Shuttle valve 46 moves in response to fluid pressure to fluidly block opposing ends of shuttle valve 46 against fluid flow. Shuttle valve 46 is fluidly coupled to valve chamber 52 via fluid passage 54. Valve chamber 52 is adjacent face portion 28 of spool 24 and disposed within valve bore 22 such that fluid pressure within valve chamber 52 acts upon face portion 28 to move spool 24 against the biasing force of spring 26.

Control valve system 10' further includes a first feedback passage 72 extending between backside chamber 32 of piston member assembly 34 and an inlet of second solenoid valve assembly 70. A restrictor 74 is disposed within fluid passage 70 to limit the amount of fluid flow through first feedback passage 72. A fluid passage 76 extends between second solenoid valve assembly 70 and a second shuttle valve 78. Fluid passage 76 is further in fluid communication with first feedback passage 72 downstream of restrictor 74.

Second shuttle valve 78 generally includes a shuttle ball 80 moveably disposed within a shuttle chamber 82. As will be described below, second shuttle valve 78 moves in response to fluid pressure to fluidly block opposing ends of second shuttle valve 78 against fluid flow. Second shuttle valve 78 is fluidly coupled to front side chamber 40 of piston member assembly 34 via a fluid passage 84. Furthermore, a second feedback passage 86 extends between second shuttle valve 78 and first shuttle valve 46. Accordingly, shuttle ball 48 of first shuttle valve 46 is moveable within shuttle chamber 50 into a first position, where shuttle ball 48 prevents fluid flow from first shuttle valve 46 to second shuttle valve 78 and permits fluid flow into valve chamber 52, and a second position, where shuttle ball 48 prevents back flow of fluid through fluid passage 44 and permits fluid flow from second feedback passage 86 to valve chamber 52. Furthermore, shuttle ball 80 of second shuttle valve 78 is moveable within shuttle chamber 82 into a first position, where shuttle ball 80 prevents fluid flow from fluid passage 76 to fluid passage 84, and a second position, where shuttle ball 80 prevents back flow of fluid from second feedback passage 86 to fluid passage 76. It should be noted, however, that shuttle ball 80 of second shuttle valve 78 can not block second feedback passage 86, hence second feedback passage 86 is always in fluid communication with either fluid passage 76 or fluid passage 84.

Figure 6:
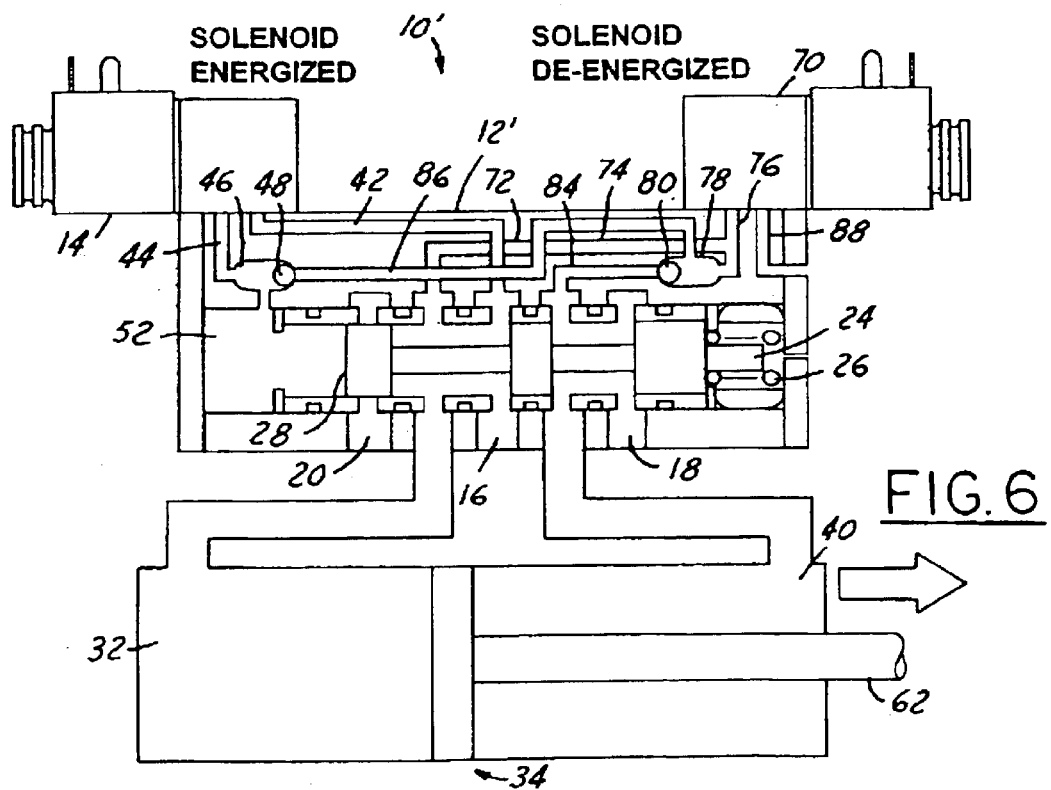
FIG. 6 is a cross-sectional view illustrating the control valve system of FIG. 5 wherein the first solenoid valve assembly is energized and the second solenoid valve assembly is de-energized.

FIG. 5 illustrates control valve system 10' in its initial equilibrium position. As illustrated in FIG. 6, first solenoid valve assembly 14 is then energized FIG. 6 illustrates control valve system 10' in a normal operation mode in which pressurized fluid from fluid inlet passage 16 is directed into backside chamber 32 of piston member assembly 34 to drive piston 62 outward (to the right in the FIGS.). Specifically, pressurized fluid from fluid inlet passage 16 is provided in fluid passage 42. First solenoid valve assembly 14 is energized such that fluid communication is established between fluid passage 42 and fluid passage 44. Pressurized fluid is then introduced from fluid passage 44 into first shuttle valve 46, thereby moving shuttle ball 48 against second feedback passage 86. Pressurized fluid within first shuttle valve 46 is then directed into valve chamber 52. The fluid pressure within valve chamber 52 acts upon face portion 28 of spool 24. Once the fluid pressure within valve chamber 52 is greater than the biasing force of spring 26, spool 24 moves to the right until shoulder portion 36 of spool 24 is seated upon second stop 38. This movement of spool 24 enables fluid to flow from fluid inlet passage 16 into backside chamber 32 of piston member assembly 34, thereby extending piston 62 outward (to the right in FIGS. 5–11). Fluid flow is consequently established between backside chamber 32 and first feedback passage 72, second solenoid valve assembly 70, and second shuttle valve 78. Due to the pressure difference in second shuttle valve 78, shuttle ball 80 will shift to close fluid passage 84 and to open second feedback passage 86. Accordingly, when control valve system 10 is in the position illustrated in FIG. 6, fluid inlet passage 16, backside chamber 32 of piston member assembly 34, fluid passage 42, first shuttle valve 46, and valve chamber 52 are all at the same fluid pressure, namely equal to the fluid pressure of fluid inlet passage 16.

Figure 7:
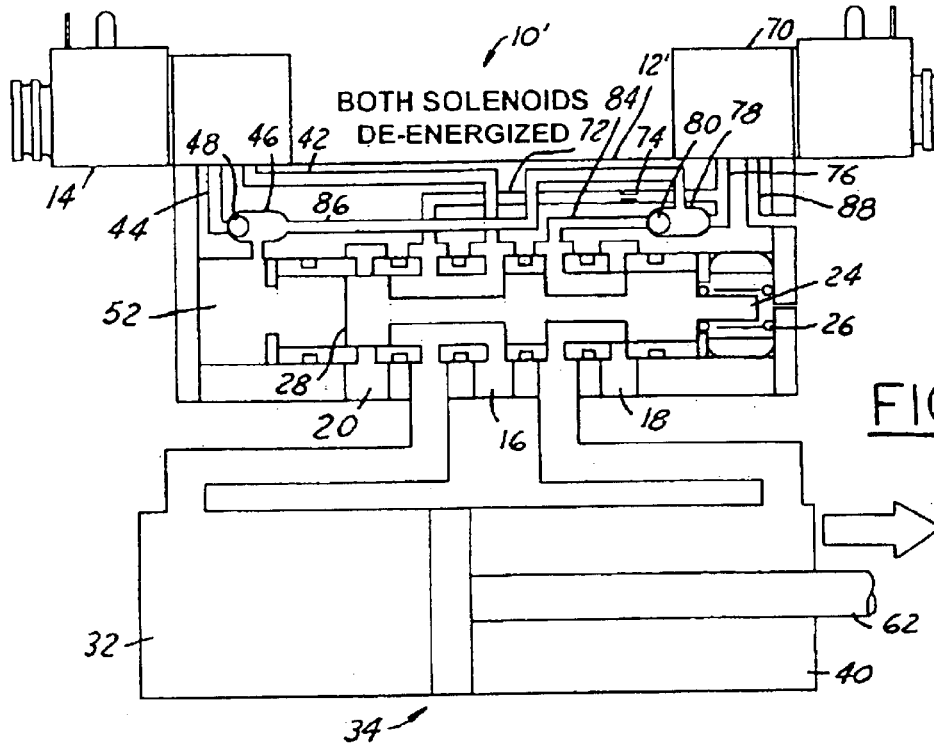
FIG. 7 is a cross-sectional view illustrating the control valve system of FIG. 5 wherein the first and second solenoid valve assemblies are de-energized and the piston continues to extend.
Figure 9:
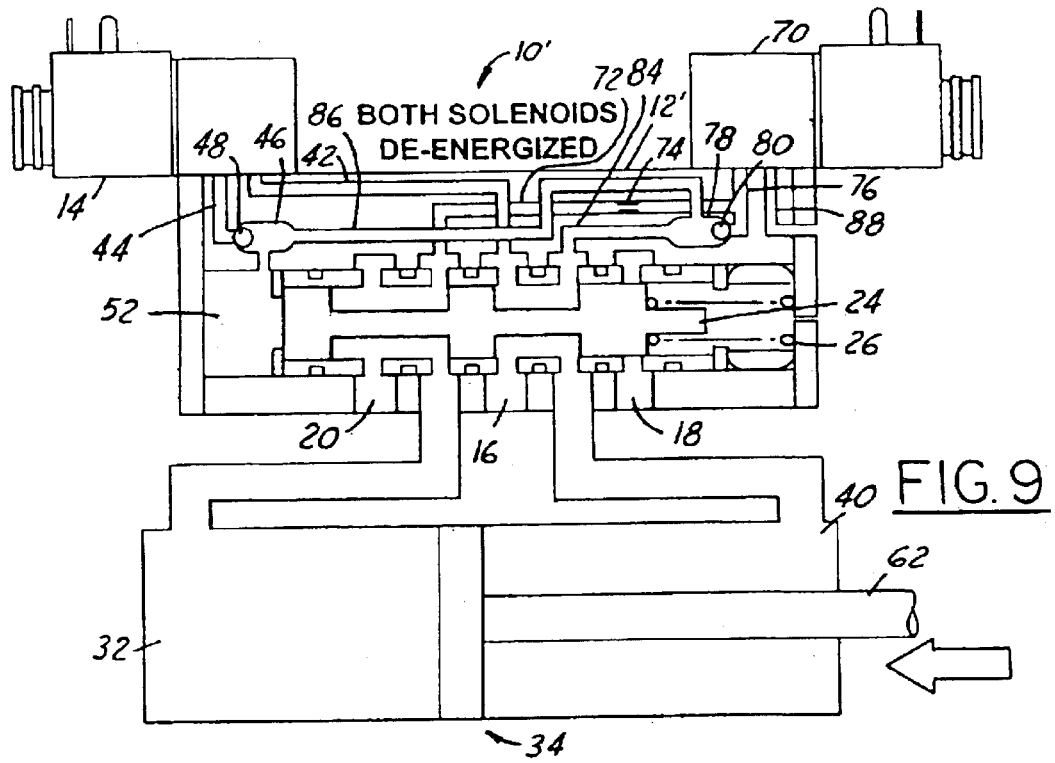
FIG. 9 is a cross-sectional view illustrating the control valve system of FIG. 5 wherein the first and second solenoid valve assemblies are de-energized and the piston continues to retract.

Referring now to FIG. 7, first solenoid valve assembly 14 and second solenoid valve assembly 70 are de-energized and therefore pilot fluid from fluid passage 42 is prevented from entering first shuttle valve 46 and, consequently, valve chamber 52. Therefore, the biasing force of spring 26 acting on shoulder portion 36 of spool 24 begins to move spool 24 leftward until face portion 28 generally contacts first stop 30 (as shown in FIG. 9). This leftward movement of spool 24 enables fluid communication between fluid inlet passage 16 and front side chamber 40 of piston member assembly 34, thereby retracting piston 62.

Figure 8:
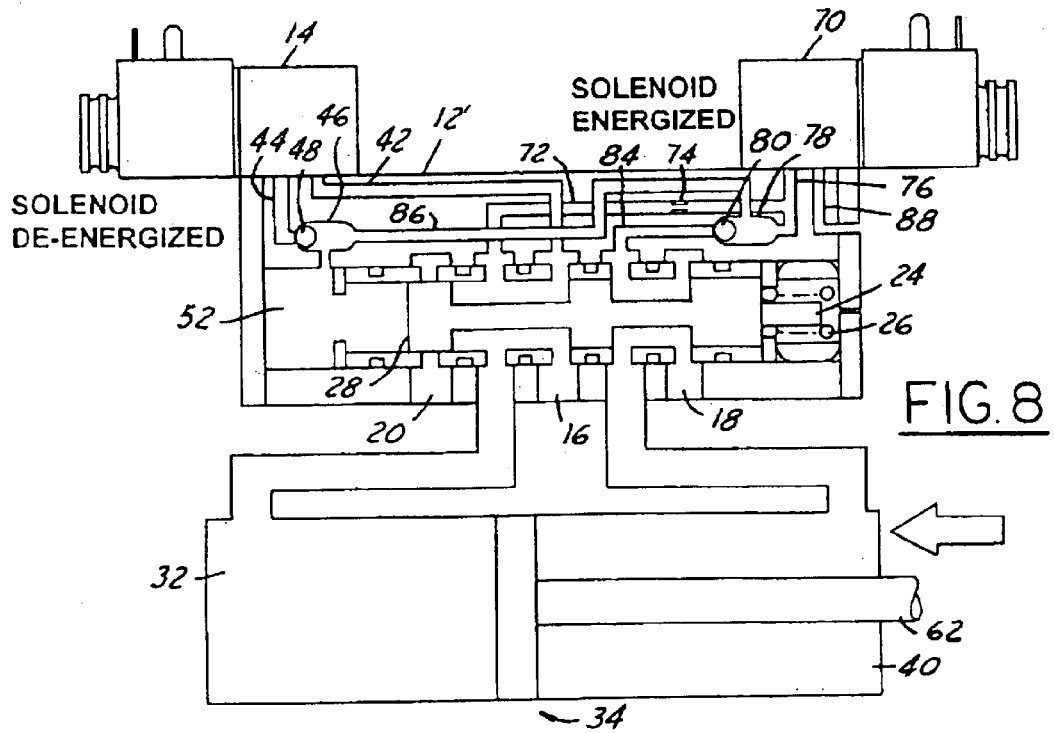
FIG. 8 is a cross-sectional view illustrating the control valve system of FIG. 5 wherein the first solenoid valve assembly is de-energized and the second solenoid valve assembly is energized.

As best seen in FIG. 8, when second solenoid valve assembly 70 is energized such that fluid communication is established between fluid passage 76 and an exhaust passage 88. Consequently, fluid pressure is relieved from valve chamber 52, first shuttle valve 46, second feedback passage 86, second shuttle valve 78, and at least a portion of first feedback passage 72 downstream of restrictor 74. This reduction of fluid pressure in valve chamber 52 causes spool 24 to move to the left under the biasing force of spring 26 as illustrated in FIG. 9. Therefore, fluid flow is established between fluid inlet passage 16 and front side chamber 40 of piston chamber assembly 32 to retract piston 62.

Figure 10:
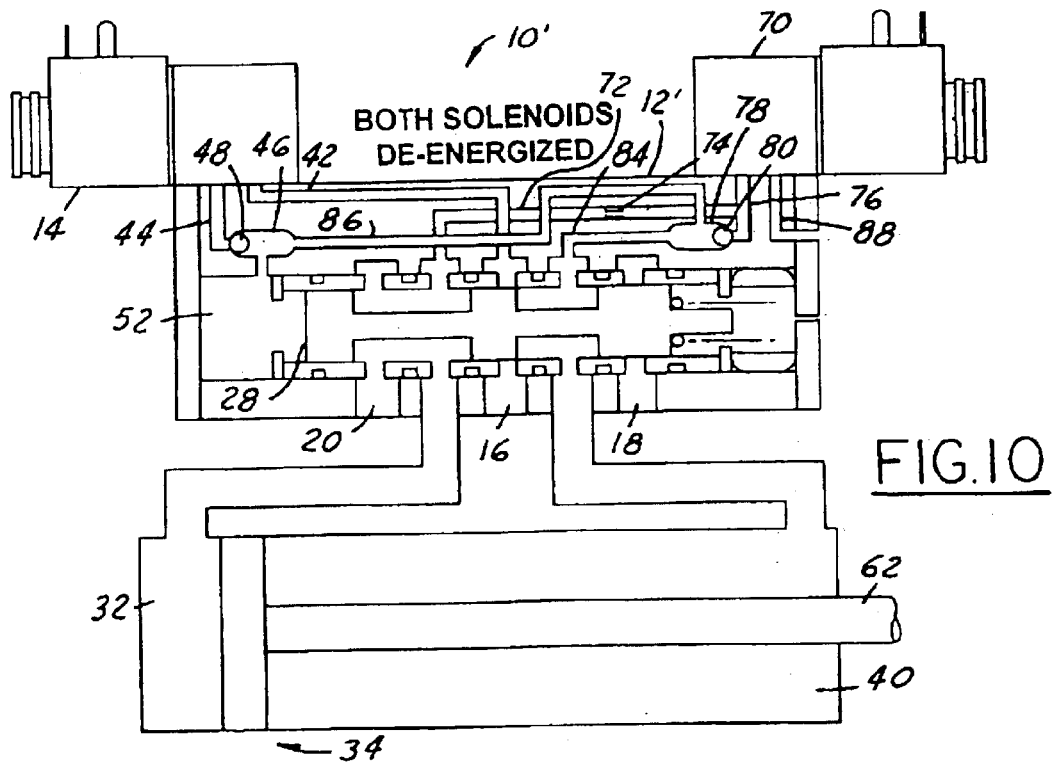
FIG. 10 is a cross-sectional view illustrating the control valve system of FIG. 5 wherein the first and second solenoid valve assemblies are de-energized and the piston is stationary.
Figure 11:
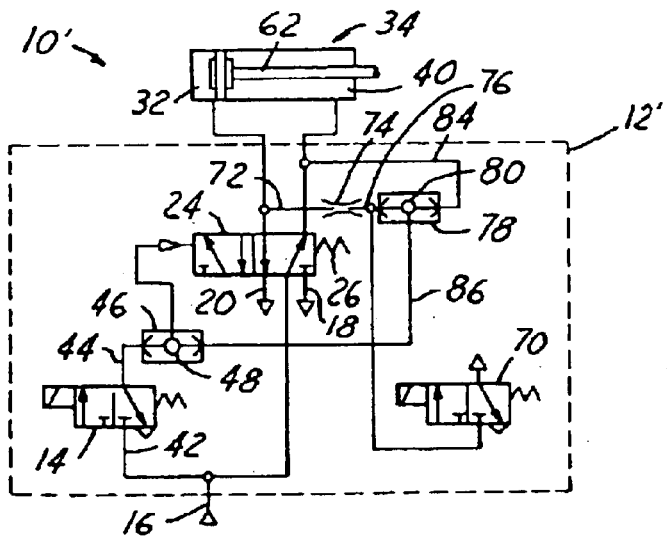
FIG. 11 is a circuit diagram illustrating the control valve system according to the second embodiment of the present invention.

As can be appreciated from FIG. 10, fluid passage 84, second shuttle valve 78, second feedback passage 86, and first shuttle valve 46 establish fluid communication between front side chamber 40 of piston member assembly 34 and valve chamber 52 and, therefore, are at the same fluid pressure in this state. As in the first embodiment, these passages serve to maintain the fluid pressure within front side chamber 40 at a pressure directly proportional to spring 26 and are able to overcome pressure leakage and the like using a pressure less than full line pressure, thereby reducing the amount of energy consumed.

Referring now to FIGS. 15–19, in which like reference numerals designate like or corresponding parts throughout the several views and those views of the previous embodiments, there is illustrated a control valve system 10" in accordance with a fourth embodiment of the present invention.

Referring in particular to FIGS. 15–17, control valve system 10" comprises a main valve assembly 12" and a solenoid valve assembly 14. Main valve assembly 12" is positioned adjacent to and operably coupled to solenoid valve assembly 14. Main valve assembly 12" includes a fluid inlet passage 16, a first exhaust passage 18, a second exhaust passage 20, and a valve bore 22". Disposed within valve bore 22" is a valve member or spool 24". Spool 24" is normally biased via a spring 26 and fluid pressure acting upon an end face 36" into a far left position to exhaust fluid from a backside chamber 32 (as in FIGS. 1–14) of a piston member assembly 34 out second exhaust passage 20 (FIG. 16). As will be described below, spool 24" is further positionable in a far-right position to exhaust fluid from a front side chamber 40 of piston member assembly 34 through first exhaust passage 18 (FIG. 15).

Spool 24" of control valve system 10" further includes an enlarged face portion 28" mounted to or formed integrally with spool 24". Enlarged end face 28" is disposed within an enlarged valve bore section 200 of valve bore 22". Enlarged face portion 28" includes a seal 202 disposed between enlarged face portion 28" and the sidewalls of enlarged valve bore section 200 to provide a sealing engagement between a first chamber 204 of enlarged valve bore section 200 (FIG. 15) and a second chamber 206 of enlarged valve bore section 200 (FIG. 16). Second chamber 206 is ventable through a vent 207. As can be seen from the figures, enlarged face portion 28" is larger in diameter than spool 24". This arrangement enables a lesser amount of pilot pressure from solenoid valve assembly 14 to actuate spool 24" to overcome the biasing force of spring 26 and the fluid pressure acting against end face 36" as compared to the above-recited embodiments. However, it should be understood that enlarged face portion 28" may be of any size that is conducive to the particular application, within the physical limits of control valve system 10".

Control valve system 10" further includes a piston 208 moveably disposed within a piston bore 210. Piston 208 includes a seal 212 disposed between piston 208 and piston bore 210 to provide a sealing engagement between a first chamber 214 of piston bore 210 (FIG. 15) and a second chamber 216 of piston bore 210 (FIG. 17). A stem 218 extends orthogonally from piston 208 into enlarged valve bore section 200 through an aperture. Stem 218 is sized to selectively engage enlarged face portion 28" of spool 24", as will be described below. Piston 208 is preferably larger in diameter than spool 24". The aperture may be sized to permit first chamber 214 and first chamber 204 to be in fluid communication with each other.

Control valve system 10" still further includes a plurality of fluid passages operably interconnecting fluid inlet passage 16, first exhaust passage 18, second exhaust passage 20, spool 24", and piston 208. A fluid passage 42" extends between fluid inlet passage 16 and an inlet to solenoid valve assembly 14. Fluid passage 42" serves as a pilot passage to supply a pilot pressure to solenoid valve assembly 14. Fluid passage 42" further extends in an opposite direction to a fluid chamber 220 defined by spool 24", end face 36" of valve bore 22", and an end cap 222. A fluid passage 44" extends between an outlet of solenoid valve assembly 14 and first chamber 204 of enlarged valve bore section 200.

Control valve system 10" further includes a feedback passage 224 extending between front side chamber 40 and second chamber 216 of piston bore 210. Accordingly, feedback passage 224 serves to provide fluid pressure from front side chamber 40 to act against piston 208 to drive piston 208 to the right. As can be seen from FIGS. 15–19, feedback passage 224 extends through an end cap 226. The significance of this arrangement will be discussed below.

FIG. 15 illustrates control valve system 10" in a normal operation mode in which pressurized fluid from fluid inlet passage 16 is directed into backside chamber 32 of piston member assembly 34 to drive a piston 62 outward (to the right in the figures). Specifically, pressurized fluid from fluid inlet passage 16 is provided in fluid passage 42". As seen in FIG. 15, solenoid valve assembly 14 is energized such that fluid communication is established between fluid passage 42" and fluid passage 44". Pressurized fluid is then introduced from fluid passage 44" into first chamber 204 of enlarged valve bore section 200. The fluid pressure within first chamber 204 of enlarged valve bore section 200 acts upon enlarged face portion 28" of spool 24". Simultaneously, pressurized fluid is introduced from fluid passage 42" into fluid chamber 220 and acts upon end face 36" of spool 24". Once the force exerted upon enlarged face portion 28" from the fluid pressure within first chamber 204 of enlarged valve bore section 200 is greater than the sum of the biasing force of spring 26 and the force exerted upon end face 36" of spool 24", spool 24" moves to the right until enlarged face portion 28" engages a shoulder portion 228. This movement of spool 24" enables fluid to flow from fluid inlet passage 16 into backside chamber 32 of piston member assembly 34, thereby extending piston 62 outward (to the right in FIGS. 1–4). Accordingly, when control valve system 10" is in the position illustrated in FIG. 15, fluid inlet passage 16, backside chamber 32 of piston member assembly 34, fluid passage 42", fluid chamber 220, and first chamber 204 of enlarged valve bore section 200 are all at the same fluid pressure, namely equal to the fluid pressure of fluid inlet passage 16.

Referring now to FIG. 16, solenoid valve assembly 14 is de-energized and therefore pilot fluid from fluid passage 42" is prevented from entering first chamber 204 of enlarged valve bore section 200. Hence, first chamber 204, second chamber 206, and first chamber 214 are vented to atmosphere. Thus, the sum of the biasing force of spring 26 and the force of fluid pressure in chamber 220 acting upon end face 36" of spool 24" biases spool 24" leftward until enlarged face portion 28" generally contacts stem 218. This leftward movement of spool 24" enables fluid communication between fluid inlet passage 16 and front side chamber 40 of piston member assembly 34, thereby retracting piston 62.

As can be appreciated from FIG. 16, feedback passage 224 is in fluid communication with front side chamber 40 of piston member assembly 34 and, therefore, is at the same fluid pressure as fluid inlet passage 16. The introduction of pressurized fluid from fluid inlet passage 16 into front side chamber 40 and feedback passage 224 enters second chamber 216 of piston bore 210 and forces piston 208 rightward. Due to the physical contact between stem 218 and enlarged face portion 28" of spool 24", any rightward movement of piston 208 causes a corresponding rightward movement of spool 24".

The pressure at which this rightward movement of spool 24" occurs is dependent upon the relative surface areas of piston 208 and end face 36" of spool 24" in addition to the biasing force of spring 26. In other words, spool 24" will move rightward once the fluid force exerted on piston 208 is greater than the sum of the fluid force, the biasing force, and any frictional force exerted on the right side. Therefore, in order to determine the applicable forces, it is necessary to consider the 1) fluid pressure and the 2) surface area the fluid pressure acts upon. As seen in FIG. 16, the fluid pressure acting upon piston 208 and spool 24" is equal to each other (namely, equal to the fluid pressure of fluid inlet passage 16). Therefore, because the surface area of piston 208 is greater than the surface area of end face 36" of spool 24", a greater force is produced on the left side of spool 24" that overcome the biasing force of spring 26 causing spool 24" to move rightward.

As seen in FIG. 17, spool 24" will continue to move rightward until spool 24" blocks fluid inlet passage 16, at which time spool 24" reaches an equilibrium position. This equilibrium position is characterized in that a predetermined fluid pressure less than the inlet pressure of fluid inlet passage 16 but greater than atmosphere exists in front side chamber 40 and, due to feedback passage 224, second chamber 216 of piston bore 210. This force exerted on piston 208 is in equilibrium with the sum of the force exerted on end face 36" and the force of spring 26. However, it should be appreciated by one skilled in the art that any fluid leaks or other anomalies, which decreases this balance, will cause a simultaneous decrease in fluid pressure within second chamber 216 of piston bore 210. This decrease in fluid pressure in second chamber 216 of piston bore 210 enables the pressure acting on end face 36" of spool 24" and the biasing force of spring 26 to move spool 24" leftward, thereby again opening fluid communication between fluid inlet passage 16 and front side chamber 40 of piston member assembly 34 until an equilibrium is once again achieved. Therefore, it should be clear that this arrangement serves to provide a low energy consuming method of automatically maintaining a predetermined fluid pressure in front side chamber 40 of piston member assembly 34 simply by choosing the appropriate relative areas of piston 208 and end face 36" and choosing the appropriate biasing force in spring 26, thereby eliminating the need for a shuttle valve 46.

Referring now to FIGS. 18 and 19, it can be seen that the present embodiment provides the opportunity to bypass piston 208 completely, thereby providing a control valve capable of operating in a non-energy saving mode. As is well known to those skilled in the art, it is sometimes preferred to use an energy saving control valve in one application while using a non-energy saving control valve in another application. Because the cost to stock both versions of replacement control valves can be enormous, control valve system 10" provides the opportunity to use one control valve in either application-energy saving mode or non-energy saving mode. To achieve this result, control valve system 10" is equipped with removable end cap 226. Feedback passage 224 extends through end cap 226. Accordingly, if an energy saving mode is needed, end cap 226 is positioned as is shown in FIGS. 15–17 (where fluid communication is maintained between front side chamber 40 and second chamber 216 of piston bore 210). However, on the other hand, if a non-energy saving mode is needed, end cap 226 is reversed as is shown in FIGS. 18–19 (wherein fluid communication is interrupted between front side chamber 40 and second chamber 216 of piston bore 210). In this position, control valve system 10" can operate similar to a standard two-position, four-way control valve.

Moreover, it should be appreciated that the pressure regulation feature of the present invention is accomplished without the need to provide full line pressure, which would otherwise consume an excessive amount of electrical energy. That is, by way of non-limiting example, traditional double action cylinders often operate such that their return to their initial position is only accomplished through the use of full-line pressure. This use of full-line pressure in the return stroke consumes an equivalent amount of compressed air as that consumed during a power stroke. This consumption of compressed air during the return stroke is believed to be unnecessary. According to the principles of the present invention, the low pressure in one outlet is sufficient for a rapid return stroke, which reduces the amount of compressed air that is consumed, thereby reducing the energy consumed by the work element. Additionally, due to the low pressure that is applied, the potential for leaks in the cylinder and/or fittings is also reduced. These advantages are obtained through the operation of the spool as a pressure regulator.

With reference to FIGS. 20–22, a variation of the above principles described in connection with the fourth embodiment is illustrated. In this regard, a control valve system 10''' is illustrated having a spool 24''' with an enlarged face portion 28''' mounted to or formed integrally with spool 24'''. Enlarged end face 28''' is disposed within an enlarged valve bore section 200' of valve bore 22'''. Enlarged face portion 28''' includes a pair of seals 202' disposed between enlarged face portion 28''' and the sidewalls of enlarged valve bore section 200' to provide a sealing engagement between a first chamber 204' of enlarged valve bore section 200' (FIG. 20) and a second chamber 206' of enlarged valve bore section 200' (FIG. 21). As can be seen from the figures, enlarged face portion 28''' is larger in diameter than spool 24'''. This arrangement enables a lesser amount of pilot pressure from solenoid valve assembly 14 to actuate spool 24''' to overcome the biasing force of spring 26' and the fluid pressure acting against end face 36" as compared to the above recited embodiments. However, it should be understood that enlarged face portion 28''' may be of any size that is conducive to the particular application, within the physical limits of control valve system 10'''.

A piston 208' moveably disposed within a piston bore 210' formed within an enlarged face portion 28'''. Piston 208' includes a seal 212' disposed between piston 208' and enlarged face portion 28''' to provide a sealing engagement between a first chamber 214' of piston bore 210' (FIG. 20) and a second chamber 216' of piston bore 210' (FIG. 22). A stem 218' extends orthogonally from piston 208' into enlarged valve bore section 200' through an aperture 219'. Stem 218' is sized to selectively engage end cap 226', as will be described below. Piston 208' is preferably larger in diameter than a spool 24'''.

Control valve system 10''' further includes a feedback passage 224' extending through spool 24''' between front side chamber 40 and first chamber 214' of piston bore 210'. Accordingly, feedback passage 224' serves to provide fluid pressure from front side chamber 40 to act against piston 208' to drive piston 208' to the left.

FIG. 20 illustrates control valve system 10''' in a normal operation mode in which pressurized fluid from fluid inlet passage 16 is directed into backside chamber 32 of piston member assembly 34 to drive a piston 62 outward (to the right in the figures). Specifically, pressurized fluid from fluid inlet passage 16 is provided in fluid passage 42". As seen in FIG. 20, solenoid valve assembly 14 is energized such that fluid communication is established between fluid passage 42" and fluid passage 44". Pressurized fluid is then introduced from fluid passage 44" into first chamber 204' of enlarged valve bore section 200'. The fluid pressure within first chamber 204' of enlarged valve bore section 200' acts upon enlarged face portion 28''' of spool 24''' and a portion of stem 218' of piston 208'. Simultaneously, pressurized fluid is introduced from fluid passage 42" into fluid chamber 220 and acts upon end face 36" of spool 24". Once the force exerted upon enlarged face portion 28''' and stem 218' of piston 208' from the fluid pressure within first chamber 204' of enlarged valve bore section 200' is greater than the sum of the biasing force of spring 26 and the force exerted upon end face 36" of spool 24''', spool 24''' moves to the right until enlarged face portion 28''' engages a shoulder portion 228'. This movement of spool 24''' enables fluid to flow from fluid inlet passage 16 into backside chamber 32 of piston member assembly 34, thereby extending piston 62 outward (to the right in FIGS. 1–4). Accordingly, when control valve system 10''' is in the position illustrated in FIG. 20, fluid inlet passage 16, backside chamber 32 of piston member assembly 34, fluid passage 42", fluid chamber 220, and first chamber 204' of enlarged valve bore section 200' are all at the same fluid pressure, namely equal to the fluid pressure of fluid inlet passage 16.

Referring now to FIG. 21, solenoid valve assembly 14 is de-energized and therefore pilot fluid from fluid passage 42" is prevented from entering first chamber 204' of enlarged valve bore section 200'. The sum of the biasing force of spring 26 and the force of fluid pressure in chamber 220 acting upon end face 36" of spool 24''' biases spool 24''' leftward until enlarged face portion 28''' and stem 218' generally contact end cap 226'. This leftward movement of spool 24''' enables fluid communication between fluid inlet passage 16 and front side chamber 40 of piston member assembly 34, thereby retracting piston 62.

As can be appreciated from FIGS. 20–22, feedback passage 224' is in fluid communication with front side chamber 40 of piston member assembly 34 and, therefore, is at the same fluid pressure as fluid inlet passage 16. The introduction of pressurized fluid from fluid inlet passage 16 into front side chamber 40 and feedback passage 224' enters first chamber 214' of piston bore 210' and forces piston 208' leftward. Due to the physical contact between stem 218' and end cap 226', any leftward movement of piston 208' causes a corresponding rightward movement of spool 24'''. The pressure at which this rightward movement of spool 24''' occurs is dependent upon the relative surface areas of piston 208' and end face 36'' of spool 24''' in addition to the biasing force of spring 26, as described above. As seen in FIG. 22, spool 24''' will continue to move rightward until spool 24''' blocks fluid inlet passage 16, at which time spool 24''' reaches an equilibrium position as described above.

It should be understood that the present variation enables efficiencies to be realized in the construction of the control valve system, namely the ease of construction. That is, the construction of the feedback passage within the spool is simpler than such construction in the housing. However, the present variation may not afford the range in flexibility in choosing the appropriate size of surface areas as compared to the fourth embodiment (FIGS. 15–19).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve system comprising:
   a housing having an inlet, a first output, and a second output;
   a valve positionable in at least a first position where fluid communication is established between said inlet and said first output, a second position where fluid communication is established between said inlet and said second output, and a third position where fluid communication is generally prevented between said inlet and said first output or said second output, said valve being biased into said first position by a biasing force;
   a solenoid valve assembly coupled in fluid communication with said inlet, said solenoid valve assembly being positionable in an actuated position where fluid communication is established with said inlet to move said valve from said first position to said second position and a deactuated position; and
   a piston extendable against said valve to counteract said biasing force for alternating said valve between said second position and said third position in response to fluid pressure within said first output.

2. The control valve system according to claim 1 wherein said piston includes a stem, said stem engaging said valve to drive said valve from said first position to said third position.

3. The control valve system according to claim 2 wherein said valve includes a first end and a second end, and wherein a surface area of said piston is larger than a surface area of said second end of said valve.

4. The control valve system according to claim 1 further comprising:
   a feedback passage extending from said first output to said piston.

5. The control valve system according to claim 4 wherein said feedback passage is selectively interruptible so as to prevent operation of said piston.

6. The control valve system according to claim 1 wherein said valve includes a first end and a second end, an area of said first end being larger than an area of said second end.

7. The control valve system according to claim 1 wherein said valve is biased into said first position in response to a spring and fluid pressure.

8. The control valve system according to claim 1 wherein said piston is moveable separate from said valve.

9. The control valve system according to claim 1 wherein said second output is in fluid communication with atmosphere when said valve is in said first position and said first output is in fluid communication with said atmosphere when said valve is in said second position.

10. A control valve system comprising:
    a housing having an inlet, a first output, a second output, and a valve chamber;
    a spool slidably disposed in said valve chamber, said spool being positionable in a first position where fluid communication is established between said inlet and said first output, a second position where fluid communication is established between said inlet and said second output, and a third position where fluid communication is generally prevented between said inlet and said first output or said second output, said spool being biased into said first position by a biasing force;
    a solenoid valve assembly coupled in fluid communication with said inlet, said solenoid valve assembly being positionable in an actuated position where fluid communication is established between said inlet to said spool to move said spool from said first position to said second position and a deactuated position; and
    a piston extendable against said spool to counteract said biasing force and driving said spool from said first position to said third position once a predetermined fluid pressure is achieved within said first output.

11. The control valve system according to claim 10 wherein said piston includes a stem, said stem engaging said spool to drive said spool from said first position to said third position in response to extension of said piston.

12. The control valve system according to claim 11 wherein said spool includes a first end and a second end, an area of said first end being larger than an area of said second end.

13. The control valve system according to claim 12 wherein an area of said piston is larger than said area of said second end of said spool.

14. The control valve system according to claim 10 further comprising:
    a feedback passage extending from said first output to said piston.

15. The control valve system according to claim 14 wherein said feedback passage is selectively interruptible so as to prevent operation of said piston.

16. The control valve system according to claim 10 wherein said spool is biased into said first position in response to a spring and fluid pressure.

17. The control valve system according to claim 10 wherein said piston is moveable separate from said spool.

18. The control valve system according to claim 10 wherein said second output is in fluid communication with atmosphere when said spool is in said first position and said first output is in fluid communication with said atmosphere when said spool is in said second position.

19. A control valve system comprising:
    a housing having an inlet, a first output, a second output, and a valve chamber;
    a spool slidably disposed in said valve chamber, said spool being positionable in a first position where fluid communication is established between said inlet and said first output, a second position where fluid communication is established between said inlet and said second output, and a third position where fluid communication is generally prevented between said inlet and said first output or said second output, said spool being biased into said first position;

a solenoid valve assembly coupled in fluid communication with said inlet, said solenoid valve assembly being positionable in an actuated position where fluid communication is established between said inlet to said spool to move said spool from said first position to said second position and a deactuated position;

a piston extendable against said spool to counteract said biasing force and driving said spool from said first position to said third position once a predetermined fluid pressure is achieved within said first output; and a feedback passage extending from said first output to said piston.

20. The control valve system according to claim 19 wherein said piston includes a stem, said stem engaging said spool to drive said spool from said first position to said third position in response to extension of said piston.

21. The control valve system according to claim 20 wherein an area of said piston is larger than an area of an opposing end of said spool.

22. The control valve system according to claim 19 wherein said feedback passage is selectively interruptible so as to prevent operation of said piston.

23. The control valve system according to claim 19 wherein said spool includes a first end and a second end, an area of said first end being larger than an area of said second end.

24. The control valve system according to claim 19 wherein said spool is biased into said first position in response to a spring and fluid pressure.

25. The control valve system according to claim 19 wherein said piston is moveable separate from said spool.

* * * * *